(12) United States Patent
Lassota

(10) Patent No.: US 6,576,282 B1
(45) Date of Patent: Jun. 10, 2003

(54) METHOD FOR UNIFORM CONTACT OF BREW INGREDIENT WITH BEVERAGE BREW LIQUID

(75) Inventor: Zbigniew G. Lassota, Long Grove, IL (US)

(73) Assignee: Food Equipment Technologies Company, Inc., Lincolnshire, IL (US)

( * ) Notice: Subject to any disclaimer, the term of this patent is extended or adjusted under 35 U.S.C. 154(b) by 0 days.

(21) Appl. No.: 09/697,849

(22) Filed: Oct. 27, 2000

Related U.S. Application Data

(62) Division of application No. 09/131,992, filed on Aug. 8, 1998, now Pat. No. 6,148,717.

(51) Int. Cl.[7] .............................. A23F 5/00; A23F 5/24
(52) U.S. Cl. ...................... 426/433; 426/594; 426/231
(58) Field of Search ............................... 426/433, 594, 426/231; 99/307, 302 R, 300, 306

(56) References Cited

U.S. PATENT DOCUMENTS

| 1,010,721 A | * | 12/1911 | Brown |
| 3,696,733 A | * | 10/1972 | Beverett |
| 4,343,232 A | | 8/1982 | Corbier |
| 4,426,920 A | * | 1/1984 | Phillips et al. |
| 4,468,406 A | | 8/1984 | D'Alayer de Costemore d'Arc |
| 4,706,555 A | | 11/1987 | Nakamura et al. |
| 4,882,983 A | | 11/1989 | Pastrick |
| 5,044,261 A | | 9/1991 | Kawazoe |
| 5,190,653 A | * | 3/1993 | Herrick et al. |
| 5,265,517 A | | 11/1993 | Gilbert |
| 5,343,799 A | * | 9/1994 | Fond |
| 5,647,055 A | | 7/1997 | Knepler |
| 5,669,287 A | | 9/1997 | Jefferson, Jr. et al. |
| 5,980,965 A | | 11/1999 | Jefferson, Jr. et al. |
| 6,016,740 A | * | 1/2000 | Hilbrich |

* cited by examiner

Primary Examiner—Anthony J. Weier
(74) Attorney, Agent, or Firm—James W. Potthast

(57) ABSTRACT

A beverage brewer (20) with a programmable dispenser cycle dispenser valve controller (36) for controlling a dispenser valve (34) to intermittently open and close during a plurality of control periods of an intermittent dispense period (88) to selectively control the quantity of hot water that is dispensed without changing the overall duration of the dispense period (88). Each of the control periods (CP1–CP20) has a duty portion during which the dispenser valve is open that is selectively varied to brew either greater or lesser amounts of beverage without varying the overall dispense period (88). Uniform contact of the hot water with the beverage ingredient (70) is enhanced by a uniform ingredient holder (24) that holds the ingredient in a tubular configuration beneath a uniform flow dispenser head (38) that pulses the top of the tubular configuration with a uniform spray.

49 Claims, 11 Drawing Sheets

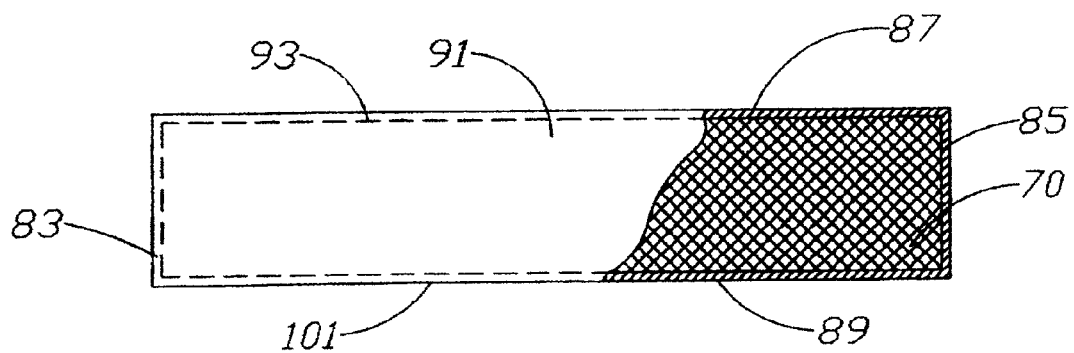
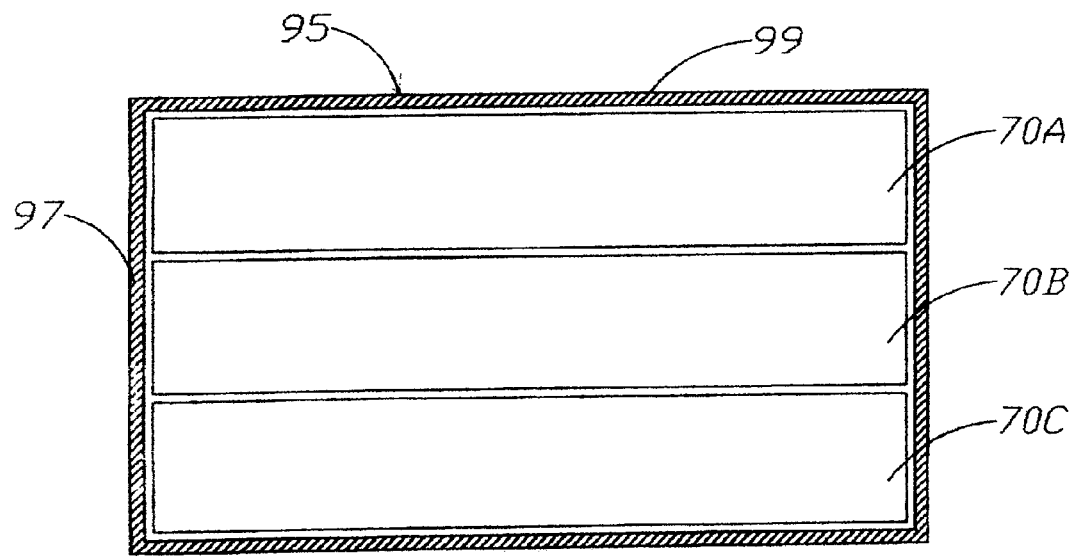

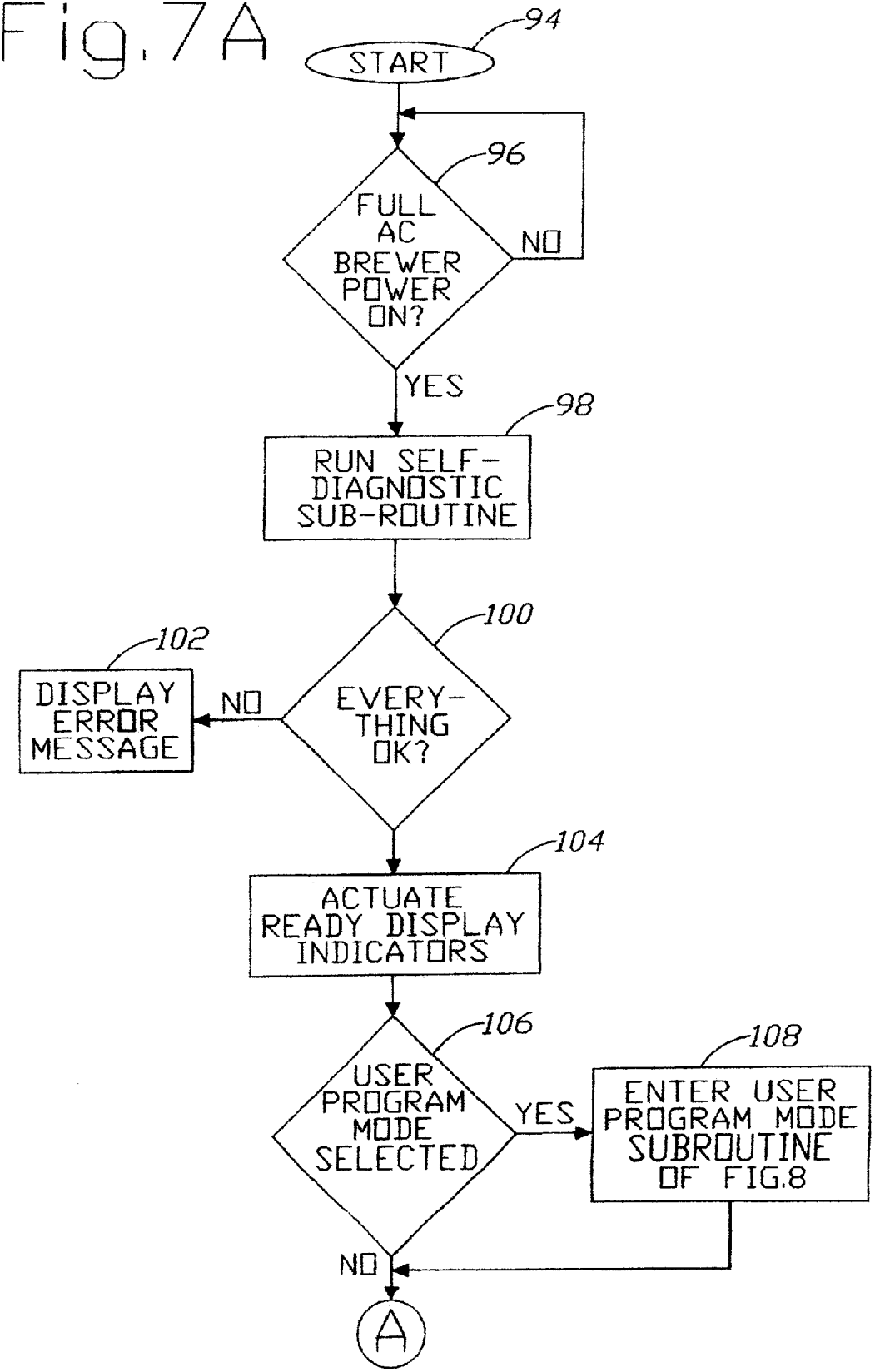

METHOD FOR UNIFORM CONTACT OF BREW INGREDIENT WITH BEVERAGE BREW LIQUID

CROSS REFERENCE TO RELATED APPLICATIONS

This application is a divisional application of and claims under 35USC120 the benefit of U.S. application Ser. No. 09/131,992, filed Aug. 8, 1998, entitled "Beverage Maker with Intermittent Beverage Liquid Dispenser and Apparatus and Method for Uniform Contact of Brew Ingredient with Beverage Brew Liquid", now U.S. Pat. No. 6,148,717 issued Nov. 21, 2003, the contents of which are hereby incorporated by reference.

BACKGROUND OF THE INVENTION

1. Field of the Invention

This invention generally relates to beverage brewers, and methods of brewing and, more particularly, to beverage brewers and methods of brewing in which the quantity of brewing liquid that is delivered to the brewing ingredient and the time period during which the brewing liquid is dispensed into a brewing ingredient holder is automatically controlled, and to beverage ingredient filters in which the ingredient is contained during brewing.

2. Discussion of the Relevant Prior Art

The inventor has determined that there is a common problem associated with all commercial beverage brewers of the drip-type in which the brew liquid is passed through brewing ingredient. The brewing ingredient is ground coffee, ground tea, tea leaves and other like dry beverage ingredients. The beverage brewing liquid is generally plain hot water The brew ingredients have a residue or structure that contains the essential dry beverage components. When the beverage brewing liquid that is passed through a layer of the dry beverage ingredient during the dispensing period of the brewing cycle and the post-dispense drip period, the dry beverage ingredients are dissolved and released into the beverage brewing liquid upon contact. The brewing ingredient is generally contained within a removable filter that is supported within a brew basket that is movably mounted beneath a brewing liquid dispenser, or dispenser, to receive the hot brewing water. The filter is manually loaded with beverage ingredient and then placed in a filter holder within the brew basket. Each of the brew basket and the filter holder has a generally truncated conical shape with sides that slope inwardly from the open top of the brew basket to the beverage dispenser outlet that is located at the bottom of the brew basket.

The problem with this arrangement is that it is not possible to obtain a uniform contact of the hot brewing water with the ingredient within the brew basket during the dispensing period while the hot water is being dispensed and the subsequent post-dispensing drip period of the brew cycle. In the case of ground coffee, when hot water first makes contact with the coffee gases are generated that causes the coffee grounds to foam upwardly and also to float layers of hot water that have not yet seeped through the upper surface of the layer of hot coffee.

The inventor believes that for this reason and because of the generally conical shape of the layer of beverage ingredient, and despite continuous spraying of the hot brewing water across the upper surface of the beverage ingredient, some of the ingredient, generally nearer the side walls of the brew basket, does not receive sufficient contact with the hot water to strip off all the beverage ingredient component to be dissolved into the water that is being held by the beverage ingredient. The beverage ingredient is therefore wasted. Likewise, other portions of the beverage ingredient, generally closer to the central portion of the brew basket receive too much contact with the hot water, ie. more contact with the water than needed to dissolve all the beverage ingredient components, and other undesirable ingredient components are dissolved into the brewed beverage. Consequently, optimum brewing of the beverage ingredient is not obtained and the brewing ingredient component that does not dissolve into the hot water because of insufficient hot water contact with the associated brewing ingredient is wasted.

Both the time of contact of the hot water with the beverage ingredient and the amount of hot water that is mixed with a given amount of beverage are critical to optimizing the quality of the resulting brewed beverage. Different types of beverage ingredient, such as different types of coffee, and different forms of a given beverage ingredient, such as a given ground coffee of different degrees of coarseness require different amounts of hot water for optimum brewing of the resulting beverage. Unfortunately, there is another problem of known beverage brewers which exacerbates the nonuniform ingredient saturation problem noted above. The problem is the inability to easily adjust the quantity of hot water that is dispensed without changing the duration of the dispensing time period, and the inability to easily adjust the duration of the dispense period without changing the quantity of hot water that is to be dispensed.

The truncated conical shape of know beverage ingredient filters precludes them from being easily stacked or packaged and accordingly in all known commercial drip-type brewers the conical filters are manually loaded with ingredient at the coffee brewing site.

Reference should be made to U.S. Pat. No. 5,000,082 entitled "Beverage Maker And Method Of Making Beverage" issued Mar. 19, 1991 and U.S. Pat. No. 5,331,885 entitled "Semiautomatic Beverage Maker And Method" issued Jul. 26,1994 of the present inventor and the patents cited therein, all of which are incorporated herein by reference, for structural, mechanical and other details of the conventional components of coffee brewers and the like, with reference to the features noted above, and in general with reference to the embodiments described below to the extent conventional elements are disclosed in functional block form only and such details are desired.

In U.S. Pat. No. 5,375,508 issued to Knepler et al ofn Dec. 27, 1994 for a "Digital Brewer Control" mechanisms are shown that enable intermittent dispensing of the hot water into the brew basket. However, this is done solely to slow down the average rate of dispensing, or infusion, of the water into the brew basket to prevent overflowing the brew basket. Such overflowing occurs during continuous dispensing under the special circumstances of decaffeinated coffee and soft water that reduces the rate of outflow from the brew basket. However, there is nothing to suggest using such intermittent flow for purposes of obtaining uniform extraction when dealing with different amounts or different types of coffee.

SUMMARY OF THE INVENTION

Accordingly, it is the primary object of the present invention to provide a beverage brewer and a method of brewing in which the aforementioned problems of known beverage brewers and brewing methods are overcome.

This objective is achieved in part by providing a beverage brewer with a beverage ingredient holder; and a dispenser assembly with means for automatically, intermittently, delivering brewing liquid into the beverage ingredient holder during a dispensing period of a brewing cycle. Preferably the dispenser assembly includes a dispenser valve, and a dispenser valve controller to control the valve for automatically, intermittently, delivering the brewing liquid into the beverage ingredient holder during the dispensing period of the brewing cycle.

Preferably, the dispenser valve controller includes means for dividing the dispensing period into a plurality of dispensing control periods, means for establishing a duty portion for at least some of the plurality of dispensing control periods, and means for actuating the dispensing valve to pass the brewing liquid to the beverage ingredient holder only during the preselected duty portion of each of the plurality of dispensing control periods.

The duty portion establishing means includes means for selectively controlling the duration of the duty portion the plurality of dispensing control periods. Different duty portions for different dispensing control periods of the same dispensing period are established to selectively vary the average flow rate at different segments of the dispensing period. The duty portion controlling means includes means for increasing the duty portion of each successive dispensing control period occurring during the dispensing period. The duty portion controlling means also preferably includes means for decreasing the duty period of each successive dispensing control period occurring during the dispensing period. Preferably, the dispenser assembly includes a computer that is programmed to control intermittent delivery of the brewing liquid to the beverage ingredient holder.

In keeping with another aspect of the present invention, the beverage ingredient holder has a brewing liquid receiving opening, and the dispenser includes a dispenser head assembly with a field of substantially uniformly spaced apart dispensing holes of substantially the same size located in coextensive overlying relationship with respect to the brewing liquid receiving inlet opening of the beverage ingredient holder and the beverage ingredient holder has a portion for supporting all of the ingredient in a substantially straight tubular configuration with spaced parallel upper and lower surfaces substantially entirely overlain by the field of dispensing holes. Preferably, the ingredient support surface is circular and the straight tubular configuration of the ingredient portion of the beverage ingredient holder is substantially cylindrical.

In accordance with another feature of the beverage brewer of the invention, the beverage brewer has a dispenser head assembly with a substantially closed body with a field of dispenser holes defining a bottom of the body and a top wall spaced oppositely from the field of dispenser holes supporting a brewing liquid inlet. A stream deflector is mounted in a blocking position between the brewing liquid inlet and the field of dispenser holes to reduce any uneven pressurization of the field of holes. A dispenser valve is periodically opened to intermittently fill the dispenser head body with brewing liquid and to uniformly force the brewing liquid out of all the dispenser holes under a uniform pressure.

Another advantageous feature of the invention is that the dispenser valve controller includes means for preselecting a length of time for the dispensing period, and means for selectively varying the total amount of brewing liquid delivered to the ingredient holder during the dispensing period of preselected length by varying the duration the intermittent periods of delivery during the dispensing period of the brewing cycle. Preferably, the intermittently delivering means includes means for dividing the dispensing period into a plurality of control periods each having a duration on the order of fifteen-seconds, and means for delivering brewing liquid during a portion of each of the control periods during the dispensing cycle. Preferably, the valve controller is a computer.

In accordance with another aspect of the invention, a beverage ingredient assembly is provided having a tubular mass of beverage ingredient configured into a tube having parallel side walls joined at opposite ends to a continuous planer top and a continuous planer bottom that are parallel to each other and substantially perpendicular to and continuously spanning the parallel side walls and a disposable water and beverage permeable filter envelope snugly enclosing the tubular mass. Preferably, the tubular mass is configured as a solid cylinder, and the permeable filter envelope is made of filter paper. The proper tubular shape of the beverage ingredient is thereby maintained while the loading of the filters is capable of being performed on an automated basis and then the beverage ingredient assemblies packaged in a vacuum container in a stacked relationship which is not easily done with truncated conical shapes of the known brewers.

In accordance with one aspect of the brewing method of the present invention independent control of the dispense period and the total brewing liquid dispensed by preselecting a dispense time period of a brewing cycle during which brewing liquid is dispensed onto a top of a beverage ingredient layer and automatically selecting a number of control periods during which beverage liquid is capable of being dispensed onto a top surface of the beverage ingredient layer in accordance with the dispense time period that has been selected and dispensing the brewing liquid onto the top surface during at least some of the number of control periods that have been selected. The duty portion of at least some of the control periods during which the brewing liquid is dispensed onto the top of the beverage ingredient layer is changed in indirect relationship to any change in the number of control periods selected to substantially fix a preselected total amount of brewing liquid dispensed during different preselected dispense time periods.

Likewise, the method includes the steps o preselecting a total amount to be dispensed during a dispense period composed of a plurality of control periods of a brewing cycle during which brewing liquid is capable of being dispensed onto a top of a beverage ingredient layer, automatically selecting a duty portion of at least some of the plurality of control periods during which the brewing liquid is capable of being dispensed onto a top surface of the beverage ingredient layer of at least some of the control periods in accordance with the total amount to be dispensed that has been preselected, and dispensing the brewing liquid onto the top surface during the duty portions of the control periods that have been selected. The duty portion of at least some of the control periods during which the brewing liquid is dispensed onto the top of the beverage ingredient layer is directly controlled in indirect relationship to any change in the number of control periods selected to substantially maintain the preselected total amount of brewing liquid to be dispensed.

BRIEF DESCRIPTION OF THE DRAWINGS

The foregoing advantageous features of the invention will be described in greater detail and other advantageous features of the invention will be made apparent from the following detailed description of the preferred embodiment of the beverage brewer of the present invention that is given with reference to the several figures of the drawing, in which:

FIG. 4C is a side elevational view, partially in section, of a cylindrical embodiment of the beverage ingredient assembly constructed in accordance with the present invention;

FIG. 4D is a cross sectional, side elevational view of a vacuum container of a plurality of substantially identical beverage ingredient assemblies like that of FIG. 4C packaged for shipping and storage.

FIGS. 7A and 7B form a composite general logic flow chart of a computer program stored in the program memory of the dispenser valve controller of FIG. 2 for operating the beverage brewer of FIG. 1 to achieve the operation shown in FIGS. 5A, 5B, 6A, 6B and 6C and otherwise to perform operations of the beverage brewer in accordance with the brewing method of the invention;

DETAILED DESCRIPTION

Figure 1:
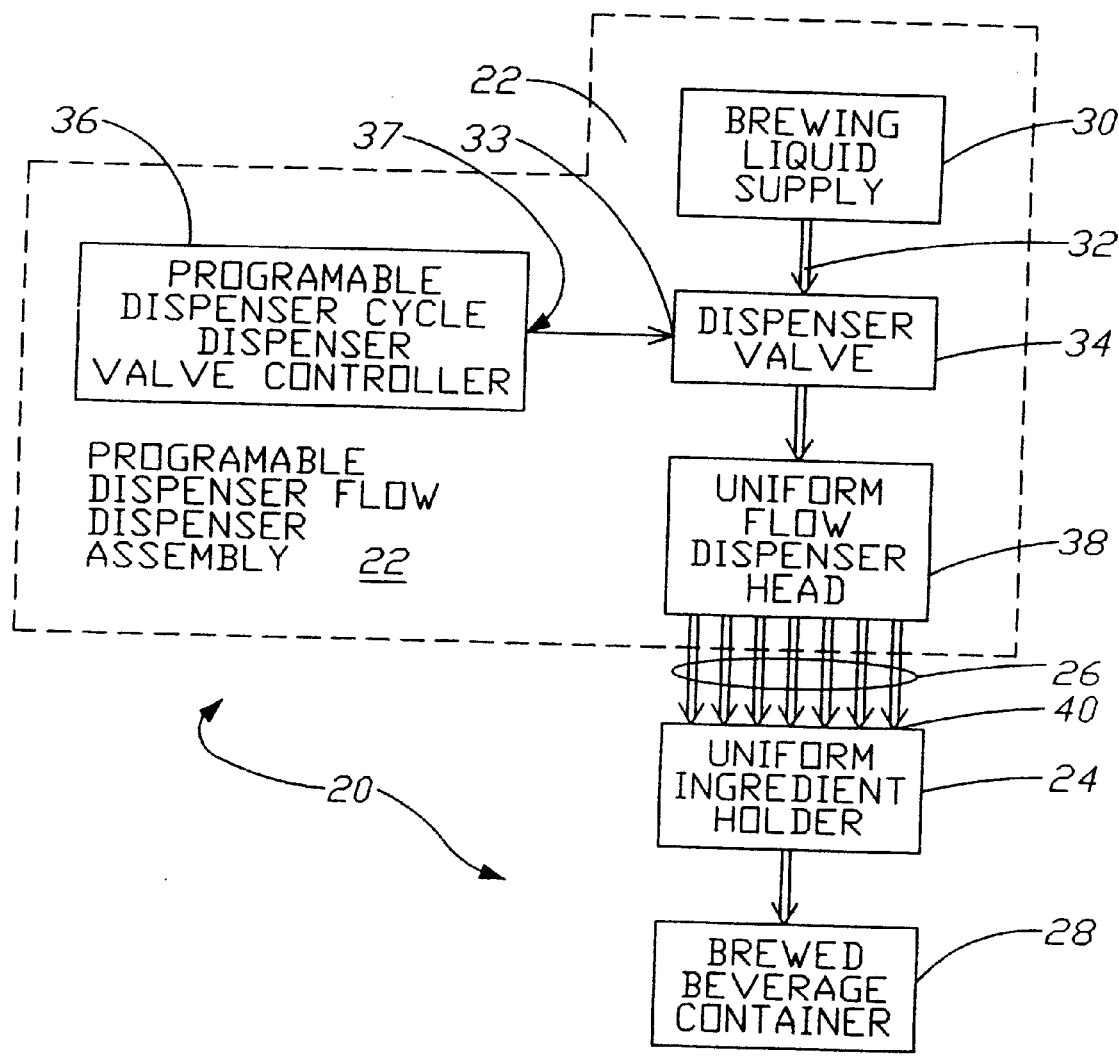
FIG. 1 is a functional block diagram of the beverage brewer constructed in accordance with the present invention.

Referring to FIG. 1, the preferred embodiment of the programmable uniform flow beverage brewer 20 includes a programmable uniform flow dispenser assembly 22 that dispenses brewing liquid, generally hot water without any additives and therefore sometimes referred to simply as the hot water, uniformly across a quantity of beverage ingredient, generally ground coffee, ground tea, tea leaves and the like, contained in an opened top uniform flow ingredient holder 24 via a plurality of pulsed, or intermittent, streams 26 of hot water. The hot water makes uniform contact with the beverage ingredient within the uniform flow ingredient holder and then passes into a brewed beverage container 28, such as a movable insulated serving urn. The programmable uniform flow dispenser assembly 22 includes a brewing liquid supply 30 containing a quantity of hot water sufficient for several brew cycles for the maximum quantity of beverage per brew cycle capable of being brewed by the brewer 10. The brewing liquid supply 30 has an open outlet 32 to a dispenser valve 34 that is controlled by a programmable dispenser cycle-dispenser valve controller, or dispenser valve controller, 36 to intermittently deliver the hot water from the outlet 32 to a uniform flow dispenser head 38. The dispenser valve 34 operates in accordance with a dispenser valve control signal generated on an output 37 of the dispenser valve controller 36 and applied to a control input 33 of the dispenser valve 34. The uniform flow dispenser head 38, in turn, delivers the intermittent streams 26 of hot water uniformly across the portion of an open top 40 of the uniform ingredient holder 24 vertically aligned with the entire top surface of the beverage ingredient contained within the uniform flow ingredient holder 24.

The uniform flow ingredient holder 24 holds the ingredient in a laterally uniform cross-sectional, tubular form, preferably a cylindrical form, in order to obtain a uniform contact of the hot water with the beverage ingredient laterally across the surface of the beverage ingredient and most importantly across ensuing layers of the beverage ingredient through to the lowest layer of beverage ingredient at the bottom of the beverage ingredient layer.

The uniform contact is achieved primarily by virtue of the tubular layer of the beverage ingredient that is shaped into the tubular configuration by the uniform flow ingredient holder 24. On the other hand, control of the dispenser cycle is primarily achieved by virtue of the controlled intermittent passage of the hot water to the uniform flow dispenser head 38.

The fact that the passage of hot water is only intermittent enables the rate of flow of the dispensing holes of the uniform flow dispenser head to be controlled independently of the size of the holes. In accordance with the present invention optimum sized dispensing holes are used that are sufficiently large to avoid clogging due to calcification and the like while being sufficiently small to enable uniform flow across the surface of the ingredient layer.

Figure 2:
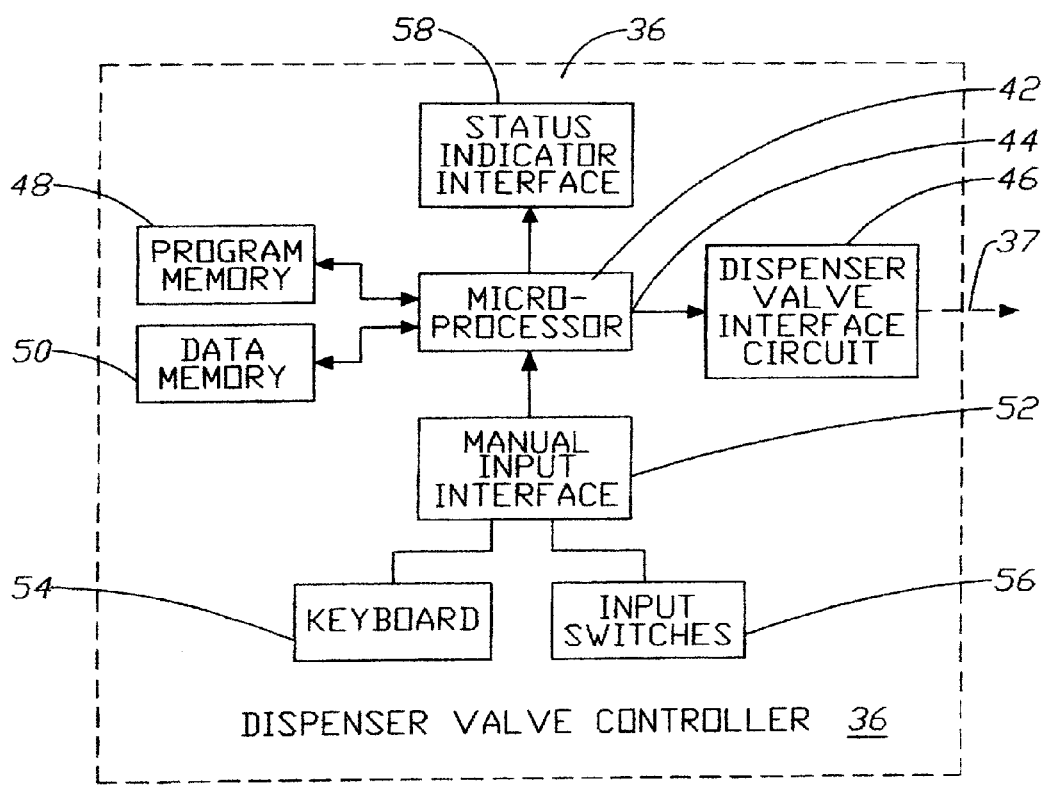
FIG. 2 is a functional block diagram of the preferred form of the dispenser valve controller shown as a single functional block diagram in FIG. 1.

Referring now to FIG. 2, the dispenser valve controller 36 preferably includes a microprocessor 42 which generates a valve control signal on an output terminal 44 that is applied to a dispenser valve interface circuit 46. The dispenser valve interface circuit amplifies the valve control signal to produce the dispenser valve control signal produced on the output terminal 37 and applied to the control input 33 of the dispenser valve 34, FIG. 1. The microprocessor 42 generates the valve control signal in accordance with a software program stored in a program memory 48, described in detail below with respect to FIG. 7, and presets and other parameters stored in a data memory 50. The microprocessor 42 also receives inputs through a manual input interface 52 from a keyboard 54 and input switches 56. The microprocessor 42 also provides input control signals to various status indicators (not shown) through a status indicator interface 58.

Figure 3A:
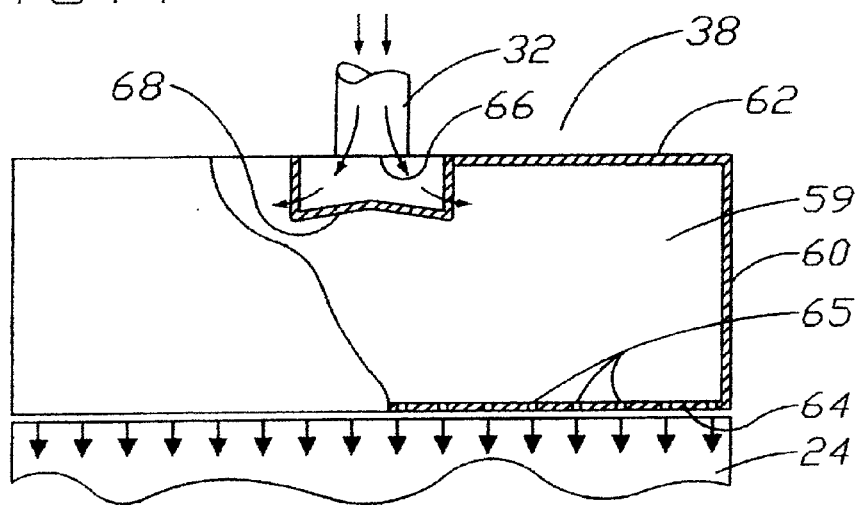
FIG. 3A is a side view, partially in cross section, of the uniform flow dispenser head of the dispenser valve assembly shown in functional block form of FIG. 1 in operative relationship with the open top of a preferred form of the tubular ingredient holder shown in FIGS. 3A and 3B.
Figure 3B:
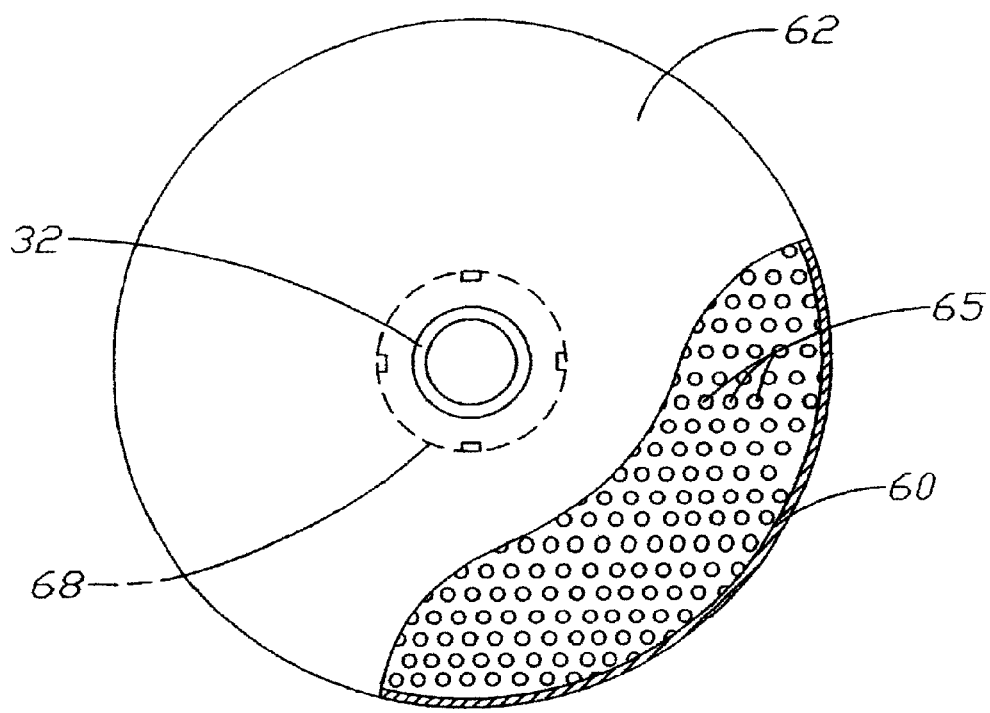
FIG. 3B is a plan view of the uniform flow dispenser head of FIG. 3A.

Referring to FIGS. 3A and 3B, the preferred form of the uniform flow dispenser head 38 is a closed cylindrical cavity 59 defined by a cylindrical side wall 60 extending between a closed top 62 that carries the central inlet 32 for receipt of the hot water from the brewing liquid supply 30 and a perforated bottom 64. The perforated bottom has a field, preferably a uniform matrix, of dispenser holes 65 for uniform dispensing of the hot water onto the top surface of the layer of ingredient within the uniform flow ingredient holder 24. Located between an opening 66 of the inlet 32 and the perforated bottom 64 is a conical deflector 68 to block the initial incoming rush of hot water from impinging directly upon and thereby unevenly pressurizing the dispenser holes 65 located directly opposite the inlet opening 66.

In accordance with the preferred method of operation of the brewer 20, the inrush of hot water under the force of the head pressure of the hot water contained within the brewing liquid supply 30, rapidly fills the cavity 59 and thereafter the hot water is dispensed through the plurality of dispenser holes 65 at a uniform head pressure for the remainder of the open portion of the control period. The volume of the cavity 59 is of course only a small portion of the total volume of beverage to be brewed and of the volume of the brewed beverage container 28.

Preferably, in the case of making several gallons of brewed beverage per brew cycle, the uniform flow dispenser head has a diameter and the cylindrical side wall 60 has a height to provide the a volume of only a fraction of a gallon. The inlet opening 66 and the head pressure provides an initial flow rate into the uniform dispenser head 38 to fill the cavity 59 within less than a second at the start of each control period. Thereafter, once the cavity 59 is filled, back pressure is encountered, and the flow rate is determined by the number and size of the plurality of dispenser holes 65. The greater the number of and the smaller the size of the dispenser holes, the more uniform will be the flow across the top surface of the ingredient layer. However, the inventor has determined that in order to minimize clogging problems the dispenser holes 65 should not be too small. On the other hand, the inventor has determined in order to obtain optimum control over the flow rate by virtue of the intermittent dispensing of the hot water during a significant portion of each of the control periods, the dispensing holes should not be too big.

Figure 4A:
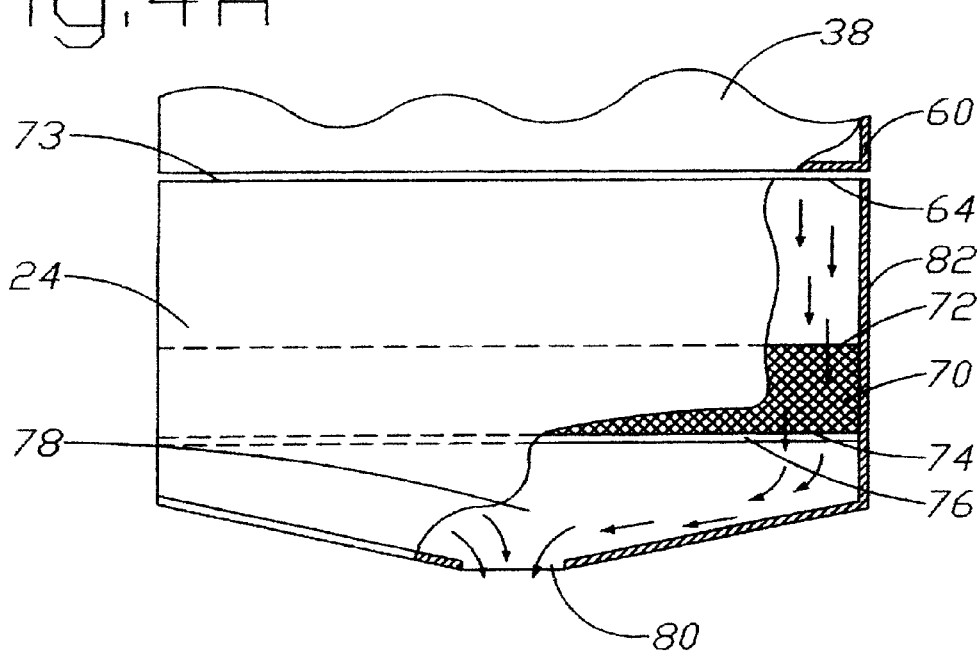
FIG. 4A is a side view, partially in cross section, of the preferred form of the tubular ingredient holder of FIG. 1 containing a layer of brewing ingredient in operative relationship with the uniform flow dispenser head of FIGS. 3A and 3B.
Figure 4B:
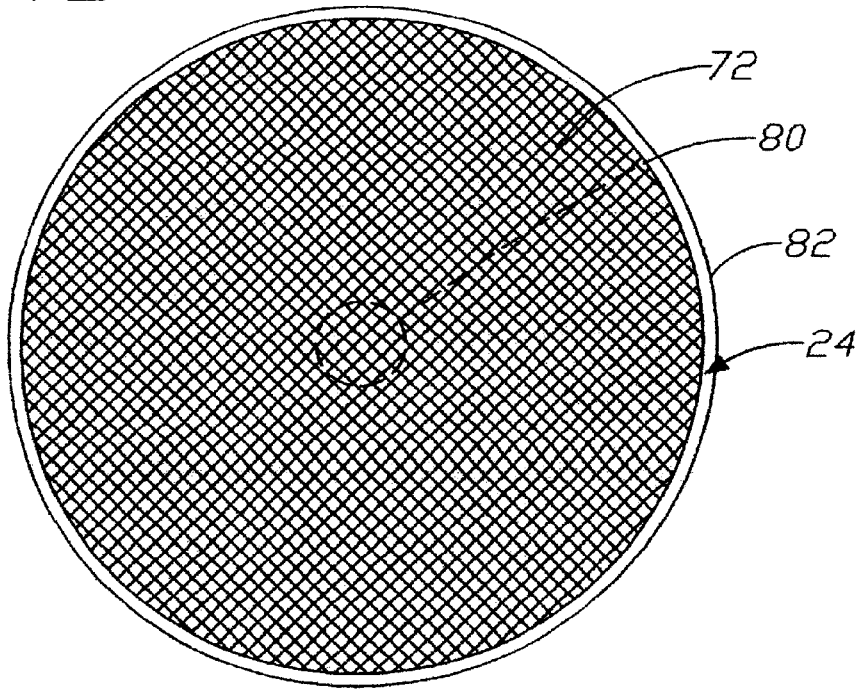
FIG. 4B is a plan view of the tubular ingredient holder of FIG. 4A.

Referring to FIGS. 4A and 4B, the uniform ingredient holder 24 holds a tubular layer of ingredient 70 beneath the perforated bottom 64 of the uniform ingredient holder 38 for uniform receipt across its top surface 72 of the hot water being dispensed. Preferably, the uniform ingredient holder 24 has an open top 73 that is coextensive with both the perforated bottom 64 and the top surface 72 of the layer of ingredient 70. Preferably, a bottom 74 of the layer of ingredient 70 is uniformly supported by an ingredient support screen 76 that supports the ingredient while allowing the free flow of brewed beverage downwardly into an inwardly tapered drainage section 78 located beneath the ingredient support screen 76. The bottom of the tapered drainage section terminates with a central brewed beverage drain opening 80. Preferably, the uniform flow ingredient holder 24 has a cylindrical side wall 82 extending between the open top 73 and the inwardly tapered drainage section 78. In such case the tapered section has a conical wall that extends between the cylindrical wall 82 and the drain opening 80, and the layer of ingredient 70 is supported in a cylindrical shape by the portion of the cylindrical adjacent and above the ingredient support screen 76.

Referring now to FIG. 4C, an embodiment of a beverage ingredient assembly 81 of the present invention is seen in which the mass of beverage of the ingredient layer 70 is maintained in a tubular configuration, preferably a solid cylindrical configuration, having a cyclindrical side wall 83. The cylindrical side wall is joined at opposite ends to a continuous, planer circular top 87 and a continuous planer circular bottom 89 that are parallel to each other and substantially perpendicular to and continuously spanning the cylindrical side wall 83. The ingredient layer 70 is supported in the cylindrical configuration by means of a disposable water and beverage permeable filter envelope 91 having a conforming cylindrical shape and snugly enclosing the tubular mass 70. The filter envelope is preferably flexible, permeable filter paper that is disposable. The enveloped tubular mass of ingredient 70 is preferably one of ground coffee, or tea, preferably ground coffee. The filter envelope 91 has a top 93 and a bottom 101, also made of filter paper, in which case the envelope is closed to prevent loss by spillage of any of the beverage ingredient 70. Alternatively, the envelope top 93 is absent, as is explained with reference to FIG. 4D, below, either before or after shipping. With the top 93 present, the brewing liquid passes through the permeable top 93 to reach the top 87 of the mass of ingredient 70.

Referring to FIG. 4D, an embodiment of a beverage ingredient assembly shipping and storage container 95 is shown in which a plurality of beverage ingredient assemblies 70A, 70B and 70C, that are substantially identical to the beverage ingredient assembly 91, are vacuum packed in stacked relationship in a snugly conforming vacuum container 97. Preferably, the vacuum container 97 is a metal or air impervious-plastic, cylindrical container with a removable top 99. In such a container 95, spillage is capable of being prevented by having the bottom 101 of an upper one of the ingredient assemblies 70A and 70B serve to close the top of a lower one of the ingredient assemblies 70B and 70C, respectively, during shipping. In this way the filter material otherwise needed for the top 93 is eliminated and the cost of the filter material saved without the problem of spillage during shipment, for the snug relationship between the vacuum container 95 and the stacked assemblies 70A, 70B and 70C holds all of the ingredient assemblies together. Preassembly of the ingredient 70 within the filter envelope substantially reduces the manual labor required in known brewers in which the filter cones are manually filled with the beverage ingredient.

Figure 5A:
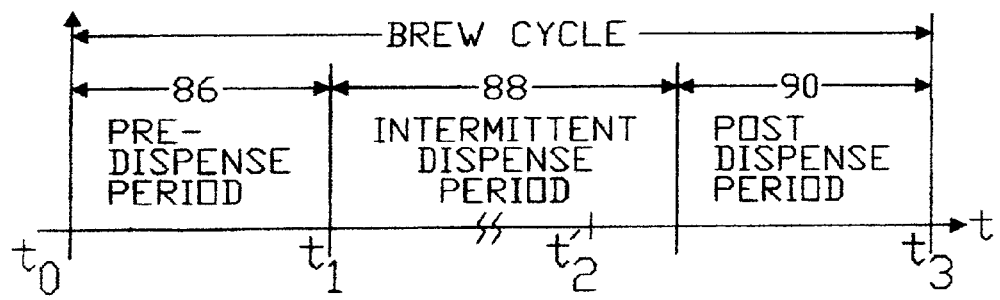
FIGS. 5A and 5B are time charts with broken time lines illustrating the preferred brew cycle of the brewing method of the invention with an intermittent dispense period, and the dispenser valve control periods, respectively.

Referring now to FIG. 5A, in accordance with the brewing method of the present invention, the brew cycle 84 is divided into three distinct time periods. First, a pre-dispense period, or pre-wetting period, 86 of approximately fifteen seconds occurs during which time the top surface 72 of the ingredient layer 70 is wetted. In the case of ground coffee, this prewetting allows the gasses that are generated from the initial wetting of the coffee to be released so as not to subsequently interfere with the uniform contact of the hot water with the coffee grounds during the subsequent intermittent dispense period that begins at time t1. Next, the intermittent dispense period 88 begins at time t1 and continues until a time selectable between time t2' and time t2, which are preferably four minutes and five minutes after time t1, respectively. At time t2, or an earlier time between time t2' and time t2, the intermittent dispensing of hot water is terminated and the post-dispense period 90 begins and then continues until time t3. During the post-dispense period, or drip period, 90 the last of the hot water that was dispensed into the ingredient holder during the intermittent dispense period 88 is allowed to seep through the layer of ingredient 70 and drain out through the brewed beverage outlet 80 into the brewed beverage container 28.

Figure 5B:
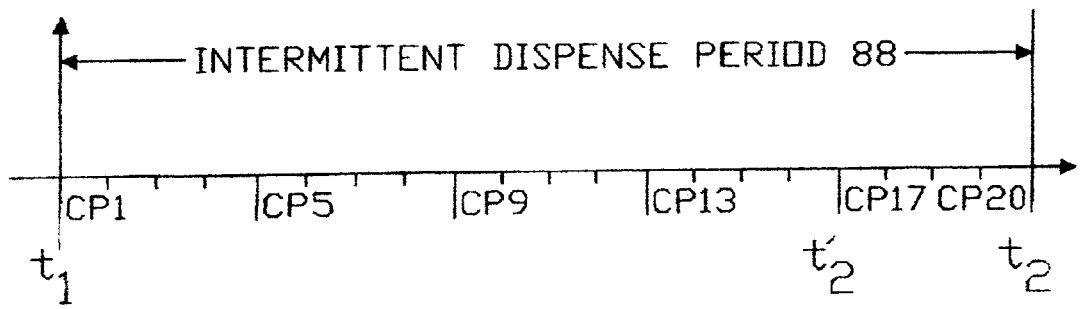

Referring to FIG. 5B, in accordance with the brewing method of the invention the intermittent dispense period 88 is divided into a plurality of control periods, preferably sixteen to twenty, each of which is preferably fifteen seconds in duration. Thus, when a maximum intermittent dispense period of five minutes occurring between times t1 and t2, there are twenty control periods, CP1 through CP20. When the minimum duration of the dispense period 88 occurring between t1 and t2' is selected then there are only sixteen control periods CP1 through CP16. If the intermittent period 88 is selected to end between times t2' and t2, then appropriate ones of the control periods CP17, C18 and C19 eliminated to achieve dispense period durations of 4.25, 4.5 and 4.75 minutes.

Figure 6A:
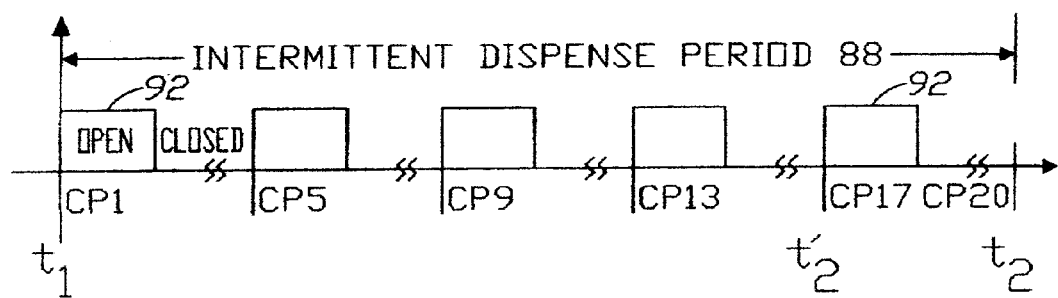
FIGS. 6A, 6B and 6C are time charts with broken lines illustrating three different modes of intermittent operation of the dispenser valve in which the on portion, or duty portion, of each of the successive control periods during the dispense period remain the same 50%, increase over time from 20% to 80% and decrease over time from 100% to 20%, respectively.
Figure 6B:
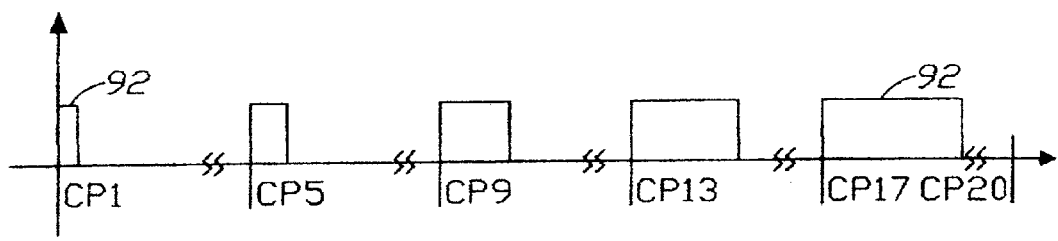
Figure 6C:
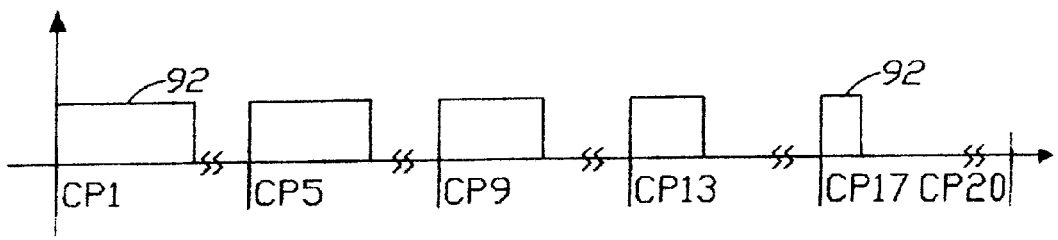

Referring now to FIGS. 6A, and 6B and 6C, in accordance with the beverage brewing method of the present invention, during a preselected portion each of the control periods that constitute the dispense period 88, such as control periods CP1 through CP20, only CP1, CP5, CP9, CP13 and CP17 being shown, a control signal 92 is generated. A shown in FIG. 6A, in one mode of operation, the percentage of each control period during which the control signal is generated, or duty portion of each control period, such as 50%, remains the same throughout the dispense period. In such case, the dispense flow rate remains the same throughout the dispense period 88. If it is desired to increase the total flow rate without changing the duration of the dispense period 88 and without changing the uniform flow throughout the dispense period 88, then the duty portion of all the control periods is increased proportionately by the same amount. For instance, presuming the duty portion is 50%, as shown if FIG. 6A, then to increase the total quantity of hot water dispensed during the dispense period by ten per cent, the duty portion of each of the control periods is increased from 50% to 55%. Likewise, in order to decrease the total amount of hot water dispensed by 20%, for instance, then the duty portion of each of the control periods is decreased from 50% to 40%.

Referring to FIG. 6A, the duty portions do not have to be selected to be the same throughout the dispense period 88. In FIG. 6A, the duty portions of successive control periods has been selected to increase from approximately 20% duty portion of control period CP1 to approximately 80% for CP17. In such case, the flow rate is not uniform over time but increases during the dispense period 88.

Referring to FIG. 6C, the duty portions of successive control period has been selected to decrease from approximately 100% at control period CP1 to approximately 20% at control period CP17. In such case, the flow rate is not uniform over time but decreases over time during the dispense period in order to reduce the duration of the post dispense period.

In accordance with the present invention, the duty portion of each of the control periods is individually selectable, and is not limited to any particular flow rate profile.

In order to decrease and-increase the total time of the dispense period 88 without changing the total amount that is dispensed, the duty portion of all the control periods is selectively, proportionately increased and decreased. For instance, if the dispense period is increased from four minutes to 4.5 minutes, a reduction of 12.5%, then the duty portion of each of the control periods is increased by 12.5%.

Figure 7B:
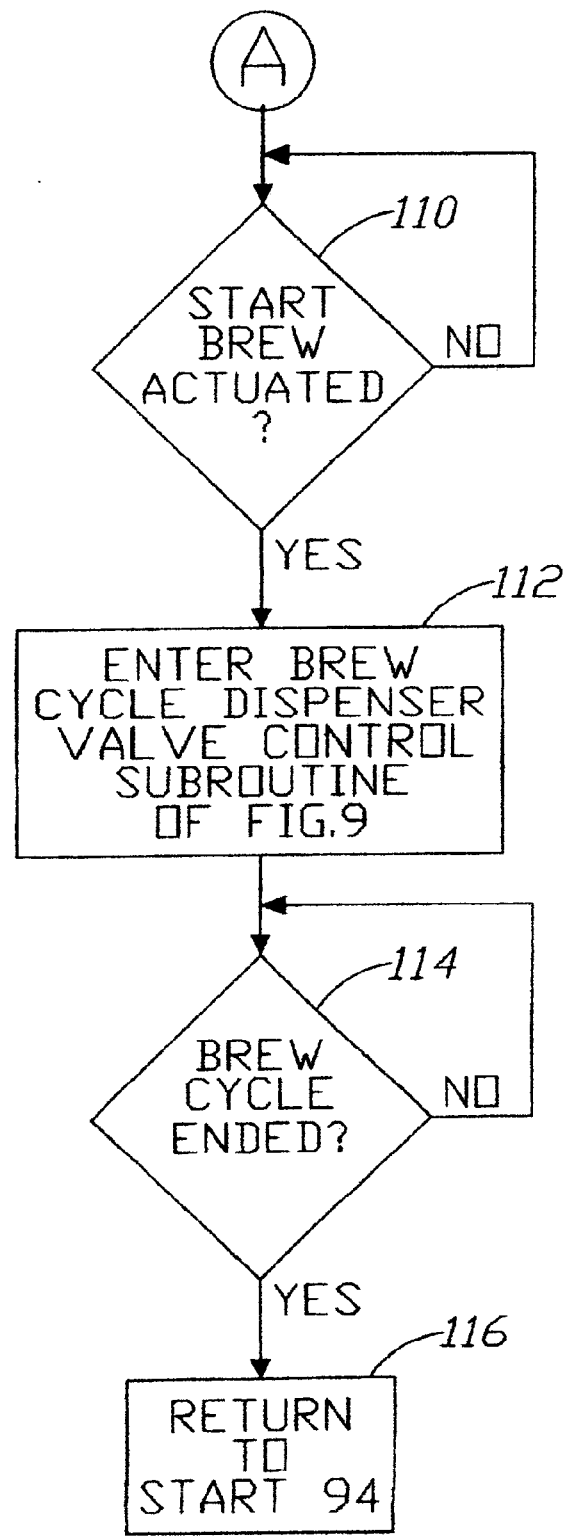

Preferably, a beverage brewer operating computer program stored in the program memory 48 operates in accordance with the composite logic flow chart of FIGS. 7A and 7B. After the program starts at step 94, in step 96 a determination is made as to whether full AC brewer power is on. If so, then in step 98 the microprocessor 42 runs a self-diagnostic sub-routine to-determine if the brewer is ready to operate. For instance, a determination is made as to whether there is sufficient hot water in the brewing liquid supply 30 and whether the hot water is at a preselected temperature. If everything is not correct for operation, then in step 100 a determination is made to proceed to step 102 at which an error message is displayed. If everything is ready for operation, then the program moves to step 104 at which ready indicators are actuated and the program advances to step 106. In step 106 a determination is made as to whether a user program mode has been selected in which the total time duration of the dispense period 88 is selected and the duty portion of each of the control periods of the dispense period is specified. If the user program mode has been selected, in order for the user to program the dispense period, then in step 108 a user program subroutine is entered that is explained below with respect to FIG. 8 Upon completion of user programming, the program proceeds to junction A and continues to FIG. 7B.

Likewise, if the user program mode has not been selected, the program proceeds to junction A and FIG. 7B.

Figure 9:
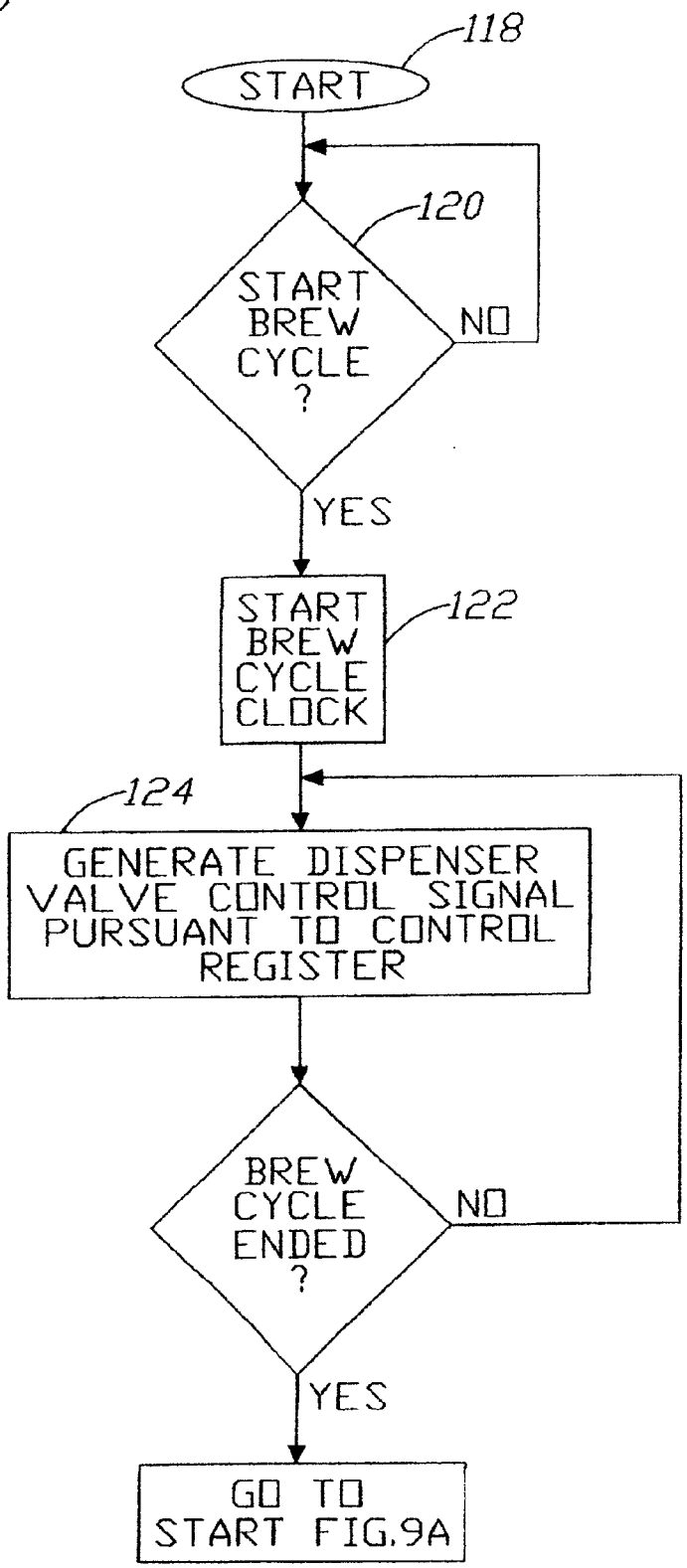
FIG. 9 is a logic flow chart of the brew cycle dispenser valve control subroutine of FIG. 7 that controls the dispenser valve of FIG. 1 to achieve intermittent dispensing in accordance with the user inputs entered pursuant to the user program mode subroutine as well as in accordance with programmable default presets.

Turning to FIG. 7B, after junction A, the program proceeds to step 110 where a determination is made whether a start brew switch has been actuated. If the start brew switch has been actuated, the program proceeds to step 112 at which step a brew cycle dispenser valve controller subroutine of FIG. 9 is entered and the dispenser valve is controlled accordingly. After a determination is made in step 114 that the brew cycle has ended, in step 116 the program returns to the start 94 of FIG. 7A.

Figure 8:
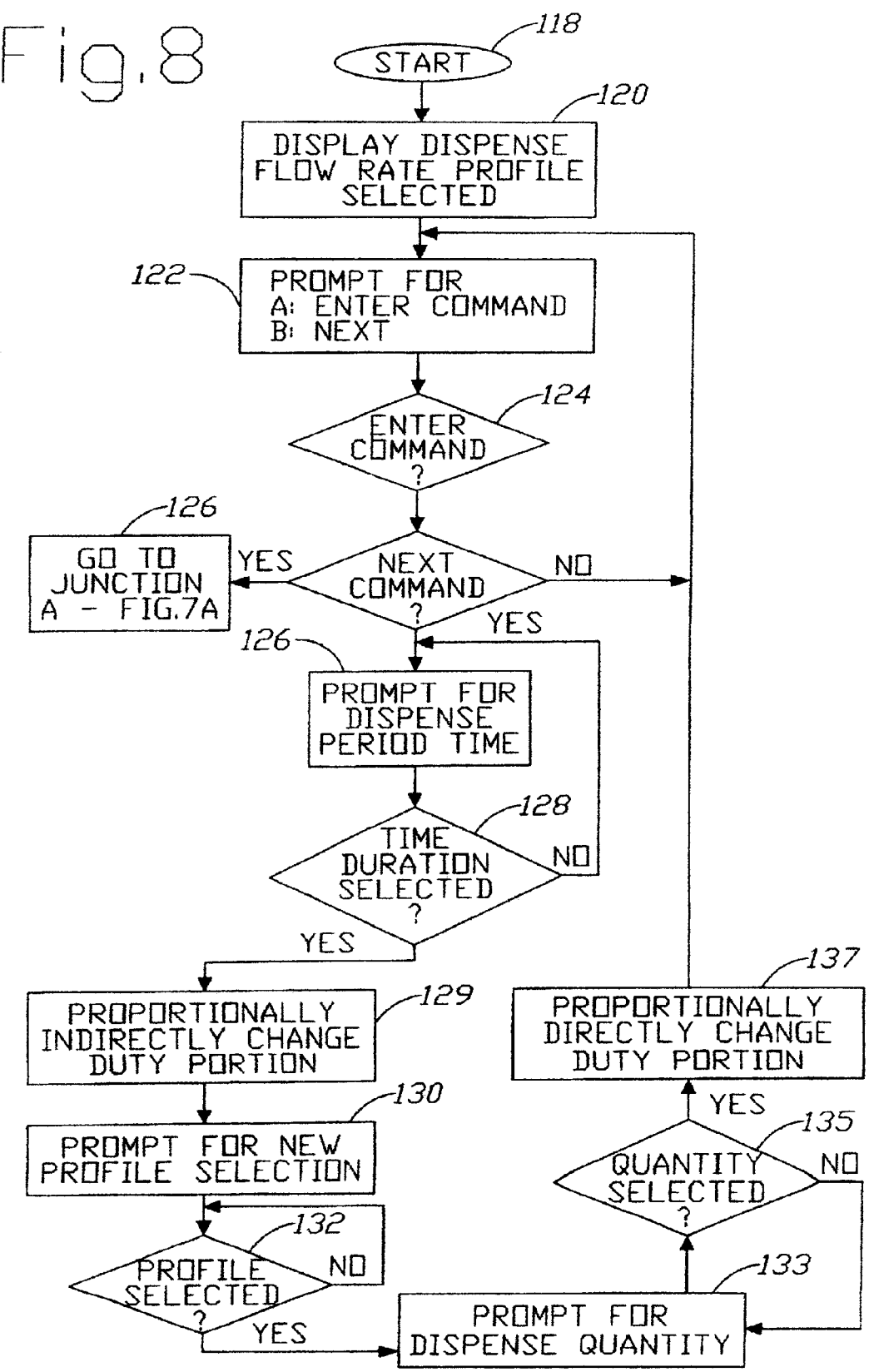
FIG. 8 is a logic flowchart of the user program mode subroutine of FIG. 7 that enables the user to selectively program the brewer to operate in accordance with different user selectable brewing parameters.

Turning to FIG. 8, the user program mode subroutine begins at start 118, and then proceeds to step 120 at which the current contents of a dispenser valve control register in the data memory 50 is displayed to provide a visual indication of the number of control periods that have been selected for the dispenser period 88 and the duty portion of each of the selected control period. In step 122, a prompt is provided to either enter the dispenser flow profile that is displayed or to change the dispenser flow profile. In step 124, if the user selects enter, then in step 126 the program returns to junction A of FIG. 7A. If not, then in step 125 the program waits for the next command. If there is a next command, in step 126 the program prompts the user for selection of the time duration of the dispense period. The user is provided with a prompt to select the one of four dispenser period durations of 4, 4.25, 4.5 and 5.0 minutes. In step 128, a determination is made as to whether the dispenser period duration has been selected.

If a new dispenser period duration has been selected, then in step 129 the duty portions are automatically changed proportionately, indirectly to maintain the selected total quantity of brewing liquid to be dispensed during the entire dispense period. Then in step 130 a prompt is provided to the user to select a dispenser period flow rate profile. This is done by simply selecting one of a plurality of preselected flow rate profiles stored in the data memory 50. Alternatively, the user creates a new flow rate profile by selecting the duty portion of each of control periods that compose the dispense period 88. In step 132, a determination is made as to whether the flow rate profile has been selected.

After the profile has been selected, then in step 133 a prompt is provided to select a dispense quantity. If a new total dispense quantity is selected in step 135, then in step 137, the duty portions are proportionately directly changed to achieve the new total quantity within the same dispense time period that has been selected. Once the selection is made, the program returns to 120 to display the newly selected flow rate profile and the user is again prompted in step 122 to either enter the new selection or to change the profile.

While no time-out steps have been shown, it should be appreciated that in the event action is not taken by the user at any of the decision steps, then after a preselected time out-time period has passed, the program proceeds to the next step, and the setting associated with the decision step remains the same. Also, although not shown, in the absence of the user selecting any of the control parameters, the program reverts to a default setting.

Referring to FIG. 9, the brew cycle dispenser valve control program, begins with a start step 138 and then proceeds to step 140 at which the brew cycle is commenced with the opening of the dispense valve for the pre-dispense wetting period 86. Simultaneously, in step 142, a brew cycle clock is started. After the pre-wetting period 86 has ended, in step 144, the dispenser valve control signal is generated in accordance with the dispense flow rate profile that has been selected in accordance with the subroutine of FIG. 8. After the dispense period has ended, in step 148 the program proceeds in step 146 back to start 138.

While a particular embodiment has been disclosed, it should be appreciated that many variations may be made thereto without departing from the scope of the invention as defined in the appended claims. For instance, while it is preferred to keep the control periods fixed and change the number of control periods to change the total dispense period duration, it is also contemplated to change the total length of the dispense period by keeping the number of control periods the same and changing the length of all of the control periods by the same amount. Likewise, while it is preferred to change the duty portion of each of the control periods by changing the time duration of the on portion during control periods of fixed duration, the duty portion is also changeable by changing the duration of the control period while maintaining a fixed duration of the on time during each control period. Also, while it is preferred that a microprocessor be used to control the dispenser valve, it should be appreciated that the same functions are capable of being implemented in an application specific integrated circuit, discrete circuit, mechanical analogs and the like. While it preferred that the intermittent dispensing be employed with the uniform flow dispenser head, it should be appreciated that the brewing method of the invention that enables controlling flow rate, total amount dispensed and the dispense period duration independently, is capable of being advantageously employed with conventional dispenser heads and ingredient holders. Likewise, the advantages of uniform flow obtained by virtue of the uniform flow dispenser head and the uniform flow ingredient holder remain extant even in the absence of intermittent dispensing, although intermittent dispensing is preferably used in conjunction with the uniform flow dispenser head and ingredient holder.

What is claimed is:

1. A method of brewing a beverage, comprising the steps of:
   providing a uniform vertical, parallel spray of brewing liquid evenly across a perpendicular uniform spray path; and
   holding all the ingredient-being brewed in a configuration having
      a flat top entirely within the spray path,
      a flat bottom that is parallel to and beneath the flat top, and
      sides that are perpendicular to and extending between the flat top and the flat bottom.

2. The brewing method of claim 1 in which
   the continuous flat top and the continuous flat bottom are defined by two circles of equal diameter to hold the ingredient in a cylindrical configuration, and in which
   the step of providing includes the step of providing the spray in spray path that has a circular cross section that is coextensive with the two circles of equal diameter.

3. A method of brewing a beverage by passing brewing liquid through a beverage ingredient, comprising the steps of:
   providing a substantially uniform vertical, parallel spray of brewing liquid evenly and continuously distributed across all of a generally continuous uniform spray path; and
   holding all the ingredient being brewed in a configuration having
      a substantially flat horizontal, continuous top substantially entirely within, and substantially coextensive with, the spray path,
      a substantially flat, horizontal, continuous bottom that is substantially parallel to and located directly beneath the substantially flat top, and
      sides that are substantially perpendicular to and extending between the substantially flat top and the flat bottom, and in which the step of holding includes the steps of
         placing all the beverage ingredient within a container made of water permeable filter material, and
         then placing the container coextensively within the continuous uniform spray path.

4. A method of brewing a beverage by passing brewing liquid through a beverage ingredient, comprising the steps of:
   providing a substantially uniform vertical, parallel spray of brewing liquid evenly and continuously distributed across all of a generally continuous uniform spray path; and
   holding all the ingredient being brewed in a configuration having
      a substantially flat horizontal, continuous top substantially entirely within, and substantially coextensive with, the spray path,
      a substantially flat, horizontal, continuous bottom that is substantially parallel to and located directly beneath the substantially flat top, and
      sides that are substantially perpendicular to and extending between the substantially flat top and the flat bottom and in which the step of holding includes the step of
         enveloping all the beverage ingredient to be brewed in a closed tubular envelope made of water permeable filter material having a configuration conforming to said configuration of all the ingredient being brewed.

5. A method of brewing a beverage by passing brewing liquid through a beverage ingredient, comprising the steps of:
   providing a substantially uniform vertical, parallel spray of brewing liquid evenly and continuously distributed across all of a generally continuous uniform spray path.; and
   holding all the ingredient being brewed in a configuration having a substantially flat horizontal, continuous top substantially entirely within, and substantially coextensive with, the spray path,
a substantially flat, horizontal, continuous bottom that is substantially parallel to and located directly beneath the substantially flat top, and
sides that are substantially perpendicular to and extending between the substantially flat top and the flat bottom and in which the step of holding includes steps of
mounting an open top of a brew basket in the uniform spray path, and
mounting a ingredient holder within the brew basket and beneath the open top, said ingredient holder holding all the ingredient in said configuration and being porous to allow beverage to pass through the ingredient holder.

6. The method of brewing of claim 1 in which the step of providing includes the step of passing the brewing liquid through a uniformly perforated surface.

7. The method of brewing of claim 6 in which the (substantially) uniformly perforated surface is a bottom of a closed dispenser head including side walls extending between a closed top with an inlet for receipt of brewing liquid and the perforated bottom.

8. A method of brewing a beverage by passing brewing liquid through a beverage ingredient, comprising the steps of:
providing a substantially uniform vertical, parallel spray of brewing liquid evenly and continuously distributed across all of a generally continuous uniform spray path by performing steps of
passing the brewing liquid through a substantially uniformly, continuously perforated surface of a bottom of a closed dispenser head.including side walls extending between a closed top with an inlet for receipt of brewing liquid to be passed through the perforated surface of the bottom,
injecting brewing liquid through the inlet, and
deflecting injected brewing liquid with a spray deflector located opposite and beneath the inlet between the closed top and the perforated bottom to prevent direct impingement of the injected brewing liquid onto the perforated bottom; and holding all the ingredient being brewed in a configuration having
a substantially flat horizontal, continuous top substantially entirely within, and substantially coextensive with, the spray path,
a substantially flat, horizontal, continuous bottom that is substantially parallel to and located directly beneath the substantially flat top, and
sides that are substantially perpendicular to and extending between the substantially flat top and the flat bottom.

9. The method of brewing of claim 6 in which the step of providing includes a step of selectively and repetitively completely filling a dispenser head with brewing liquid.

10. The method of brewing of claim 7 including a step of placing a beverage container having a minimum volume of sufficient size to hold all the beverage to be brewed from all the brew ingredient that is at least several times a volume of the dispenser head.

11. A method of brewing a beverage in a beverage maker having a beverage ingredient holder capable of receiving a brewing liquid and holding a beverage ingredient with a beverage ingredient top surface area, comprising the steps of:
introducing a volume of brewing liquid evenly across a horizontal perforated dispensing head with a surface area equal to said beverage ingredient top surface area; and
dispensing from the dispensing head a uniform vertical and parallel stream of brewing liquid into said beverage ingredient holder and across the entire beverage ingredient top surface area.

12. The method of claim 11 wherein said perforated dispensing head is coplanar with said beverage ingredient top surface area.

13. The method of claim 11 wherein said beverage ingredient holder has vertical sidewalls.

14. The method of claim 12 wherein said beverage ingredient has a flat top surface.

15. A method of brewing a beverage by mixing hot brewing liquid with a beverage ingredient, comprising the steps of:
delivering a substantially uniform, vertical, parallel spray of brewing liquid falling, vertically and evenly across a continuous, uniform spray path on an intermittent basis by
repetitively rapidly filling and maintaining filled for a preselected intermittent period a dispenser head,
draining brewing liquid from the dispenser head through a plurality of dispensing holes uniformly distributed across a bottom of the dispenser head while the dispenser head is being filled, remains filled and until drained completely of brewing liquid,
repetitively allowing the dispenser head to completely drain between periods of repetitively filling of the dispenser head to provide controlled interruptions of delivering of the spray of brewing liquid; and
holding beverage ingredient in a beverage ingredient holder within a brew basket with an open top, said ingredient being held in a straight tubular configuration having a horizontal top, a horizontal bottom and vertical sides joining the top and the bottom, with the top of the ingredient being directly beneath and entirely within the uniform spray path.

16. The method of claim 15 in which the dispenser head is filled within less than a second and is maintained filled for approximately five to fifteen seconds.

17. The method of claim 16 in which the dispenser head is filled repetitively for approximately four to five minutes.

18. The method of claim 16 including the step of prewetting the beverage ingredient prior to repetitively filling of the dispenser head by delivering a quantity of beverage liquid for a period of approximately five seconds to approximately fourth-five seconds.

19. The method of claim 16 in which after the dispenser head is filled the rate of draining the dispenser head is controlled by a pressure head of a source of beverage liquid connected to the dispenser head though a valve and including the step of maintaining the pressure head substantially constant to maintain a substantially uniform rate of flow of beverage liquid being drained from the dispenser head.

20. A method of brewing a beverage by passing brewing liquid through a beverage ingredient, comprising the steps of:
providing a substantially uniform vertical, parallel spray of brewing liquid evenly and continuously distributed across all of a generally continuous uniform spray path.; and
holding all the ingredient being brewed in a configuration having a substantially flat horizontal, continuous top substantially entirely within, and substantially coextensive with, the spray path, a substantially flat, horizontal, continuous bottom that is substantially parallel to and located directly beneath the substantially flat top, and sides that are substantially perpendicular to and extending between the substantially flat top and the flat bottom, holding the sides with non-porous material continuously covering the sides to prevent passage of liquid other than through the flat bottom.

21. The brewing method of clam 3 in which the continuous flat top and the continuous flat bottom are defined by two circles of equal diameter to hold the ingredient in a generally cylindrical configuration and in which the step of providing includes the step of providing the spray in spray path that has a circular cross section that is coextensive with the two circles of equal diameter.

22. The brewing method of claim 3 in which the step of holding includes a step of enveloping all the beverage ingredient to be brewed in a closed tubular envelope made of water permeable filter material having a configuration conforming to said configuration of all the ingredient being brewed.

23. The method of brewing of claim 5 in which the step of holding includes steps of mounting an open top of a brew basket in the uniform spray path, and mounting a ingredient holder within the brew basket and beneath the open top, said ingredient holder holding all the ingredient in said configuration and being porous to allow beverage to pass through the ingredient holder.

24. The method of brewing of claim 3 in which the step of providing includes the step of passing brewing liquid through a substantially uniformly continuously perforated surface.

25. The method of brewing of claim 24 in which the substantially uniformly perforated surface is a bottom of a closed dispenser head including side walls extending between a closed top with an inlet for receipt of brewing liquid for passage to the perforated bottom.

26. The method of claim 25 in which the step of providing includes the steps of injecting brewing liquid through.the inlet, and deflecting injected brewing liquid with a spray deflector located opposite and beneath the inlet between the closed top and the perforated bottom to prevent direct impingement of the injected brewing liquid onto the perforated bottom.

27. The method of brewing of claim 24 in which the step of providing includes a step of selectively and repetitively filling a dispenser head with brewing liquid.

28. The brewing method of claim 4 in which the continuous flat top and the continuous flat bottom are defined by two circles of equal diameter to hold the ingredient in a generally cylindrical configuration and in which the step of providing includes the step of providing the spray in spray path that has a circular cross section that is coextensive with the two circles of equal diameter.

29. The brewing method of claim 4 in which the step of holding includes a step of enveloping all the beverage ingredient to be brewed in a closed tubular envelope made of water permeable filter material having a configuration conforming to said configuration of all the ingredient being brewed.

30. The method of brewing of claim 4 in which the step of holding includes steps of mounting an open top of a brew basket in the uniform spray path, and mounting a ingredient holder within the brew basket and beneath the open top, said ingredient holder holding all the ingredient in said configuration and being porous to allow beverage to pass.through the ingredient holder.

31. The method of brewing of claim 4 in which the step of providing includes the step of passing brewing liquid through a substantially uniformly continuously perforated surface.

32. The method of brewing of claim 31 in which the substantially uniformly perforated surface is a bottom of a closed dispenser head including side walls extending between a closed top with an inlet for receipt of brewing liquid for passage to the perforated bottom.

33. The method of claim 32 in which the step of providing includes the steps of injecting brewing liquid through the inlet, and deflecting injected brewing liquid with a spray deflector located opposite and beneath the inlet between the closed top and the perforated bottom to prevent direct impingement of the injected brewing liquid onto the perforated bottom.

34. The method of brewing of claim 31 in which the step of providing includes a step of selectively and repetitively filling a dispenser head with brewing liquid.

35. The brewing method of claim 5 in which the continuous flat top and the continuous flat bottom are defined by two circles of equal diameter to hold the ingredient in a generally cylindrical configuration and in which the step of providing includes the step of providing the spray in spray path that has a circular cross section that is coextensive with the two circles of equal diameter.

36. The brewing method of claim 5 in which the step of holding includes a step of enveloping all the beverage ingredient to be brewed in a closed tubular envelope made of water permeable filter material having a configuration conforming to said configuration of all the ingredient being brewed.

37. The brewing method of claim 5 in which the step of holding includes a step of enveloping all the beverage ingredient to be brewed in a closed tubular envelope made of water permeable filter material having a configuration conforming to said configuration of all the ingredient being brewed.

38. The method of brewing of claim 5 in which the step of providing includes the step of passing brewing liquid through a substantially uniformly continuously perforated surface.

39. The method of brewing of claim 38 in which the substantially uniformly perforated surface is a bottom of a closed dispenser head including side walls extending between a closed top with an inlet for receipt of brewing liquid for passage to the perforated bottom.

40. The method of claim 39 in which the step.of providing includes the steps of injecting brewing liquid through the inlet, and deflecting injected brewing liquid with a spray deflector located opposite and beneath the inlet between the closed top and the perforated bottom to prevent direct impingement of the injected brewing liquid onto the perforated bottom.

41. The method of brewing of claim 38 in which the step of providing includes a step of selectively and repetitively filling a dispenser head with brewing liquid.

42. The brewing method of claim 20 in which the continuous flat top and the continuous flat bottom are defined by two circles of equal diameter to hold the ingredient in a generally cylindrical configuration and in which the step of providing includes the step of providing the spray in spray path that has a circular cross section that is coextensive with the two circles of equal diameter.

43. The brewing method of claim 20 in which the step of holding includes a step of enveloping all the beverage ingredient to be brewed in a closed tubular envelope made of water permeable filter material having a configuration conforming to said configuration of all the ingredient being brewed.

44. The brewing method of claim 20 in which the step of holding includes a step of enveloping all the beverage ingredient to be brewed in a closed tubular envelope made of water permeable filter material having a configuration conforming to said configuration of all the ingredient being brewed.

45. The method of brewing of claim 20 in which the step of holding includes steps of mounting an open top of a brew basket in the uniform spray path, and mounting a ingredient holder within the brew basket and beneath the open top, said ingredient holder holding all the ingredient in said configuration and being porous to allow beverage to pass through the ingredient holder.

46. The method of brewing of claim 20 in which the step of providing includes the step of passing brewing liquid through a substantially uniformly continuously perforated surface.

47. The method of brewing of claim 46 in which the substantially uniformly perforated surface is a bottom of a closed dispenser head including side walls extending between a closed top with an inlet for receipt of brewing liquid for passage to the perforated bottom.

48. The method of claim 47 in which the step of providing includes the steps of injecting brewing liquid through the inlet, and deflecting injected brewing liquid with a spray deflector located opposite and beneath the inlet between the closed top and the perforated bottom to prevent direct impingement of the injected brewing liquid onto the perforated bottom.

49. The method of brewing of claim 46 in which the-step of providing includes a-step,of selectively and repetitively filling a dispenser head with brewing liquid.

* * * * *